United States Patent
Zhang et al.

[11] Patent Number: 5,932,180
[45] Date of Patent: *Aug. 3, 1999

[54] OZONE AND OTHER REACTIVE GAS GENERATOR CELL AND SYSTEM

[75] Inventors: Xinyu Zhang, Malden; Vitaly Berkman, Brookline; Donald Smith, Belmont, all of Mass.

[73] Assignee: Applied Science and Technology, Inc., Woburn, Mass.

[*] Notice: This patent is subject to a terminal disclaimer.

[21] Appl. No.: 08/871,088

[22] Filed: Jun. 9, 1997

Related U.S. Application Data

[63] Continuation-in-part of application No. 08/298,653, Aug. 31, 1994, Pat. No. 5,637,279.

[51] Int. Cl.$^6$ ............................................... B01J 19/08
[52] U.S. Cl. ........................... 422/186.07; 422/186.14; 422/186.15; 422/186.2
[58] Field of Search ..................... 422/186.07, 186.14, 422/186.15, 186.2

[56] References Cited

U.S. PATENT DOCUMENTS

| | | | |
|---|---|---|---|
| Re. 30,320 | 7/1980 | Lowther ................................. | 204/176 |
| 3,622,492 | 11/1971 | Kinney .................................. | 204/322 |
| 3,872,313 | 3/1975 | Emigh et al. ........................... | 250/541 |
| 3,963,625 | 6/1976 | Lowther ................................. | 250/533 |
| 3,970,567 | 7/1976 | Lowther ................................. | 250/533 |
| 3,984,697 | 10/1976 | Lowther ................................. | 250/532 |
| 3,996,474 | 12/1976 | Lowther ................................. | 250/532 |
| 4,049,707 | 9/1977 | Harter et al. .......................... | 250/531 |
| 4,062,748 | 12/1977 | Imris ..................................... | 204/176 |

(List continued on next page.)

FOREIGN PATENT DOCUMENTS

| | | |
|---|---|---|
| 206622C2 | 12/1970 | Germany . |
| 1909802C2 | 8/1984 | Germany . |
| 3427274A1 | 1/1986 | Germany . |
| 3830106A1 | 3/1989 | Germany . |
| 1985-57450 | 9/1986 | Japan . |
| 803724 | 10/1958 | United Kingdom . |
| 1549055 | 7/1979 | United Kingdom . |
| WO90/15018 | 12/1990 | WIPO . |

OTHER PUBLICATIONS

S. Masuda et al., "A Ceramic–Based Ozonizer Using High-–Frequency Discharge" *IEEE Transactions on Industry Applications* 24(2):223–231 (Mar./Apr. 1988.

W.E. Cromwell et al., "Effect of Gaseous Diluents on Energy Yield of Ozone Generation from Oxygen", Ozone Chemistry and Technology, H.A. Leedy (Ed.), In Advances in Chemistry Series No. 21 (Proc. Int. Ozone Conference, Chicago, Nov. 1956) pp. 304–331.

International Search Report for corresponding PCT Application No. PCT/US95/10764 dated Dec. 21, 1995.

A.K. Brewer et al., "Chemical Action in the Glow Discharge IV. The Synthesis of Ozone" *J. Phys. Chem.* 34:1280–1293 (1930). (no month available).

*Primary Examiner*—Kishor Mayekar
*Attorney, Agent, or Firm*—Testa, Hurwitz & Thibeault, LLP

[57] ABSTRACT

A reactive gas generator cell includes a high voltage assembly having a high voltage electrode plate and a low voltage assembly having a low voltage electrode plate. Each of the high and low voltage assemblies may include a cover plate and a channel plate. A welded metallic seal may join the high voltage assembly and the low voltage assembly to create a permanently sealed chamber between the assemblies. A refractory metal surface, which may be a tungsten surface, is disposed on at least one of the low voltage electrode plate and the high voltage electrode plate. A dielectric barrier is disposed between the high voltage electrode plate and the low voltage electrode plate. A discharge region for confining a reactive gas is defined, at least in part, by the refractory metal surface and a surface of the dielectric barrier. A spacer, which may be formed from a refractory material, may be positioned between the surface of the dielectric barrier and the refractory metal surface to define a predetermined gap.

24 Claims, 8 Drawing Sheets

U.S. PATENT DOCUMENTS

| | | | |
|---|---|---|---|
| 4,100,421 | 7/1978 | Tabata et al. | 250/533 |
| 4,167,466 | 9/1979 | Orr, Jr. et al. | 204/176 |
| 4,430,306 | 2/1984 | Namba et al. | 422/292 |
| 4,614,573 | 9/1986 | Masuda et al. | 204/176 |
| 4,666,679 | 5/1987 | Matsuda et al. | 422/186.07 |
| 4,877,588 | 10/1989 | Ditzler et al. | 422/186.19 |
| 4,882,129 | 11/1989 | Andrews et al. | 422/186.2 |
| 4,954,321 | 9/1990 | Jensen | 422/186.19 |
| 4,970,056 | 11/1990 | Wooten et al. | 422/186.07 |
| 5,047,127 | 9/1991 | Tottori et al. | 204/176 |
| 5,063,030 | 11/1991 | Sweetman | 422/189 |
| 5,102,629 | 4/1992 | Hayashi et al. | 422/186.07 |
| 5,211,919 | 5/1993 | Conrad | 422/186.07 |
| 5,364,600 | 11/1994 | Stiehl et al. | 422/186.07 |
| 5,370,846 | 12/1994 | Yokomi et al. | 422/186.07 |
| 5,397,962 | 3/1995 | Moslehi | 315/111.51 |
| 5,569,437 | 10/1996 | Stiehl et al. | 422/186.07 |
| 5,637,279 | 6/1997 | Besen et al. | 422/186.07 |

OZONE AND OTHER REACTIVE GAS GENERATOR CELL AND SYSTEM

RELATED APPLICATIONS

The present invention is a continuation-in-part of Ser. No. 08/298,653, filed Aug. 31, 1994, now U.S. Pat. No. 5,637,279 the entire disclosure of which is incorporated herein by reference.

FIELD OF THE INVENTION

This invention relates to ozone and other reactive gas generator cells and systems for producing high concentrations of reactive gases. In particular, the present invention relates to an ozone gas generator cell and system modularly employing a plurality of ozone generator cells for generating ozone from ultra pure oxygen.

BACKGROUND OF THE INVENTION

Ozone is useful for numerous applications that require a high level of oxidation. For example, ozone is useful for disinfection of drinking water and has been used for water treatment since the early 1900s. More recently, ozone has been used for semiconductor device processing. One application for ozone in semiconductor device processing is forming insulating layers on semiconductor wafers by growing insulating films or by oxidizing thin films on the wafer. For example, high deposition rate chemical vapor deposition of high quality $SiO_2$ can be accomplished by using a TEOS/ozone process.

Another application for ozone in semiconductor device processing is for cleaning semiconductor wafers and the processing chambers of semiconductor processing equipment. Ozone is particularly useful for removing hydrocarbons from the surface of semiconductor wafers or from processing chambers. Using ozone for cleaning is advantageous because it avoids the use of dangerous chemicals which require costly disposal. In contrast, ozone does not present a toxic waste disposal problem because ozone decays to oxygen without residues.

The use of ozone in semiconductor device processing has imposed increased demands on ozone generating equipment. For semiconductor processing applications, the ozone must be very pure so that it does not introduce contaminates into the process. Some ozone generators expose elastomeric seals and electrodes to the ozone. The ozone reacts with these materials and produces contaminates that can deteriorate the elastomeric seal and some electrode materials. The use of elastomeric seals also makes leak detection difficult because such seals are designed for positive pressure.

Some ozone generators require the use of inert dopant gases such as nitrogen or carbon dioxide to increase the ozone concentration to acceptable levels. These gases are known to introduce contamination in the process. For example, when nitrogen interacts with the ozone, $N_xO_x$ and nitric acid are produced if trace amounts of moisture are present in the process chamber. These chemicals corrode the process chamber and the ozone delivery system and can contaminate the wafer being processed.

In addition, ozone generators for semiconductor processing applications should be small in dimensions because clean room space in semiconductor manufacturing facilities is very expensive. Current ozone generators are large and may require substantial ancillary refrigeration equipment in order to achieve the required ozone generation rates. To reduce the size of high concentration ozone generators, some generators distribute the electrode area over a number of smaller cells. This introduces uneven gas flow to and from the various cells and, therefore, reduces ozone production efficiency. The semiconductor industry also demands high reliability and low down time of the equipment.

U.S. Pat. No. 5,364,600 describes an ozone generator that generates a high yield of ozone from an oxygen containing gas. This generator uses a spiral wire electrode formed from a single refractory metal to reduce contamination and to increase ozone yield. Wire electrodes operate at relatively high temperatures because they can not be attached directly to a heat sink. Wire electrodes have a relatively short lifetime because of the thermal stress that they experience. In addition, wire electrodes are relatively inefficient because ozone production reduces with temperature.

SUMMARY OF THE INVENTION

It is therefore a principle object of this invention to provide an ozone generator that generates pure ozone in high concentrations by using ultrapure oxygen ($\geq$ grade 5) without the use of inert dopant gases. It is another principle object of this invention to provide an ozone generator that uses a plate electrode formed from a refractory material. It is another principle object of this invention to provide an ozone generator that uses a permanent, non-elastomeric seal.

It is another principle object of this invention to provide an ozone generator that is modular in design and that is physically smaller and lighter in weight than existing ozone generators. Other principle objects of the invention include providing an ozone generator that is highly reliable and that does not require the use of refrigeration. Further principle objects of the invention include providing balanced, uniformed gas delivery to the generating cells.

It is a principle discovery of the present invention that high concentration pure ozone can be generated by using ultrapure oxygen without the use of inert dopant gases by using an ozone generator having a discharge region defined, at least in part, by a refractory metal surface. It is another principle discovery of the present invention that using a plate electrode formed from a refractory metal allows for continuous generation of high concentration ozone without the use of an inert dopant gas.

It is another principle discovery of the present invention that a welded metallic seal that creates a permanently sealed chamber between a high voltage assembly and a low voltage assembly of an ozone generating cell results in an efficient, reliable, and compact ozone generator cell. It is another principle discovery that these welded ozone generating cells can be joined in a unitary ozone generating system including manifolds for introducing oxygen and coolant and for removing ozone.

Accordingly, the present invention features a reactive gas generator cell that includes a high voltage assembly having a high voltage electrode plate and a low voltage assembly having a low voltage electrode plate. Each of the high voltage assembly and the low voltage assembly may include a cover plate and a channel plate. The gas generator cell may include a welded metallic seal joining the high voltage assembly and the low voltage assembly to create a permanently sealed chamber between the assemblies that includes a discharge region.

A refractory metal surface, which may be a tungsten surface, is disposed on at least one of the low voltage electrode plate and the high voltage electrode plate. A dielectric barrier is disposed between the high voltage electrode plate and the low voltage electrode plate. A discharge region, which confines a reactive gas, is defined, at least in part, by the refractory metal surface and a surface of the dielectric barrier. The dielectric barrier may include a conductive coating on a surface opposite the dielectric surface. A spacer, which may be formed from a refractory material, may be positioned between the surface of the dielectric barrier and the refractory metal surface to define a predetermined gap which may be substantially 0.005 inch or less.

The present invention also features a reactive gas generator cell that includes a high voltage assembly having a high voltage electrode and a low voltage assembly having a low voltage electrode. Each of the high voltage assembly and the low voltage assembly may include a cover plate and a channel plate. An electrical insulator may be positioned between the electrode and the cover and channel plates of one or both of the high voltage assembly and the low voltage assembly. A welded metallic seal joins the high voltage assembly and the low voltage assembly to create a permanently sealed chamber between the assemblies that includes a discharge region.

A refractory metal surface, which may be a tungsten surface, is disposed on at least one of the low voltage electrode and the high voltage electrode. A dielectric barrier is disposed between the high voltage electrode and the low voltage electrode. A discharge region, which confines a reactive gas, is defined, at least in part, by the refractory metal surface and a surface of the dielectric barrier. A spacer, which may be formed from a refractory material, may be positioned between the surface of the dielectric barrier and the refractory metal surface to define a predetermined gap which may be substantially 0.005 inch or less.

The present invention also features a generator system comprising a plurality of modular reactive gas generator cells. Each cell includes a high voltage assembly having a high voltage electrode and a low voltage assembly having a low voltage electrode. A welded metallic seal joins the high voltage assembly and the low voltage assembly to create a permanently sealed chamber between the assemblies that includes a discharge region.

A refractory metal surface is disposed on at least one of the low voltage electrode and the high voltage electrode. A dielectric barrier is disposed between the high voltage electrode and the low voltage electrode. A discharge region, which confines a reactive gas, is defined, at least in part, by the refractory metal surface and a surface of the dielectric barrier.

An oxygen inlet and an ozone outlet engage respective inlets and outlets of adjacent cells to establish an oxygen inlet manifold and an ozone outlet manifold. Each oxygen inlet may include a flow restrictor for equalizing the pressure in the inlet manifold to balance a flow of oxygen to each cell. Each assembly of each cell may include a coolant inlet and a coolant outlet which engage the coolant inlets and outlets of adjacent assemblies to establish a coolant inlet manifold and a coolant outlet manifold.

BRIEF DESCRIPTION OF THE DESCRIPTION OF THE DRAWINGS

This invention is described with particularity in the appended claims. The above and further advantages of this invention may be better understood by referring to the following description taken in conjunction with the accompanying drawings, in which:

DETAILED DESCRIPTION

The present invention is described in terms of ozone generator cells and systems. The present invention, however, can be embodied as a reactive gas generator cell and system for any reactive gas.

Figure 1A:
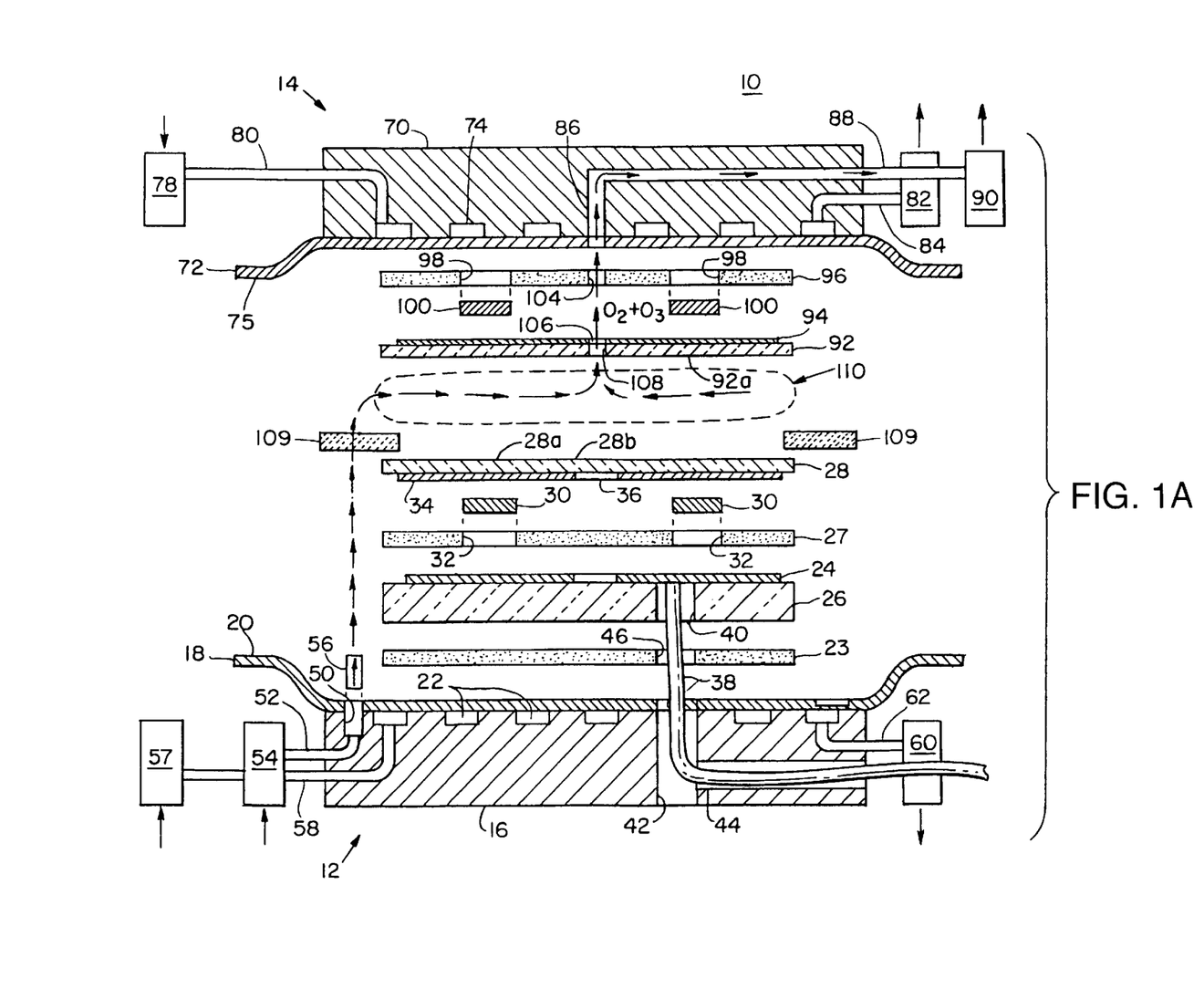
FIGS. 1A and 1B are exploded sectional schematic views of an ozone generator cell that embodies the invention.

FIG. 1A illustrates an exploded sectional schematic view of an ozone generator cell 10 that embodies the invention. The generator cell 10 includes a high voltage assembly 12 and a low voltage assembly 14. The high voltage assembly 12 comprises a channel plate 16 and a cover plate 18 that are coupled together to form a plurality of serpentine cooling channels 22. The cover plate 18 may be nickel brazed to channel plate 16. Cover plate 18 has a convex shell-like plate with a flared circumferential rim that provides a welding surface 20.

The high voltage assembly 12 includes a high voltage electrode 24, which may be a 0.0002 inch thick layer of metalization that is approximately 3.5 inches in diameter. The high voltage electrode 24 is mounted on a high voltage isolation dielectric element 26, which may be approximately 0.090 inch thick. The isolation dielectric element 26 may by mounted on cover plate 18 by a layer 23 of thermally conductive adhesive. The layer 23 of adhesive may be approximately 0.003 inch thick and approximately 4 inches in diameter.

The adhesive may be an epoxy such as Ablestick 561K. This particular epoxy has excellent thermal conductivity. The isolation dielectric element 26 electrically isolates the cover plate 18 from the high voltage electrode 24. Providing such electrical isolation allows the use of inexpensive conductive coolant fluids, such as common tap water, in the cooling channels 22, thereby eliminating the need for expensive non-conducting cooling fluids, such as silicone based cooling fluids.

A layer 27 of thermally conductive adhesive, which may also be an epoxy such as Ablestick 561K, is positioned between the high voltage electrode 24 and a dielectric barrier 28. The dielectric barrier 28 may be alumina. The layer 27 of adhesive may be approximately 0.003 inch thick and approximately 4 inches in diameter. The layer 27 may include vias 32 dimensioned to accept electrically conductive elements 30 that provide good electrical contacts between the high voltage electrode 24 and the dielectric barrier 28. The conductive elements 30 may be approximately 0.003 inch thick and approximately 0.25 inch in diameter. The layer 27 assists in transferring heat from a surface 28A, which is exposed to the discharge, to the channel plate 16.

The dielectric barrier 28 includes a conductive layer 34 on a surface facing the layer 27 of thermally conductive adhesive and the conductive elements 30. The conductive layer 34 provides a broad and even electric field distribution across the dielectric barrier 28. The conductive layer 34 may be silver and may be approximately 0.0002 inch thick and approximately 3.5 inches in diameter A hole 36 may be provided in conductive layer 34 to reduce the electric field in a central region 28B of dielectric barrier 28 so as to reduce the possibility of generating an electric arc through the low voltage assembly 10.

An insulated high voltage lead wire 38 is coupled to the high voltage electrode 24 through a hole 40 in the isolation dielectric 26, a hole 46 in the thermally conductive layer 23, and holes 42 and 44 in the channel plate 16. The high voltage lead wire 38 energizes the high voltage electrode 24.

Channel plate 16 includes an oxygen input passage 50 that is coupled to an oxygen inlet manifold element 54 through a conduit 52. A flow restrictor 56 is disposed in oxygen input passage 50. The flow restrictor 56 balances the flow of oxygen into each cell 10 so as to equalize the pressure in the cell and in a manifold (not shown) formed in the ozone generator system when a plurality of modular ozone generating cells 10 are combined. The channel plate 16 also includes a coolant inlet manifold element 57 that is coupled to the coolant channels 22 through a conduit 58. In addition, the channel plate 16 includes a coolant outlet manifold element 60 that is coupled to the coolant channels 22 through conduit 62.

Low voltage assembly 14 comprises a channel plate 70 and a cover plate 72 that are coupled together to form a plurality of serpentine cooling channels 74. The cover plate 72 has a convex shell-like plate with a flared circumferential rim that provides a welding surface 75 that mates with welding surface 20 on cover plate 18. The cover plate 72 may be nickel brazed to channel plate 70. A coolant inlet manifold element 78 is coupled to the coolant channels 74 by a conduit 80. A coolant outlet manifold element 82 is coupled to the coolant channels 74 by a conduit 84.

The low voltage assembly 14 includes a low voltage electrode 92, which in a preferred embodiment of this invention, has a surface 92A comprising a refractory material. The low voltage electrode 92 may also include a conductive layer 94 opposite surface 92A. The refractory material may be a refractory metal such as tungsten, nickel, tantalum, niobium, or molybdenum. The refractory material may also be a refractory metal compound such as tungsten carbide. In addition, the refractory material may be a refractory metal alloy such as alloy c-276 or alloy HX. The low voltage electrode 92 may be formed by spraying or electron beam evaporating refractory material onto a ceramic material.

A layer 96 of thermally conductive material is positioned between the low voltage electrode 92 and the cover plate 72. The layer 96 may include vias 98 that are dimensioned to accept electrically conductive elements 100 that provide good electrical contacts between the low voltage electrode 92 and the cover plate 72. The conductive elements 100 may be approximately 0.003 inch thick and approximately 0.25 inch in diameter. The layer 96 assists in transferring heat from the surface 92A of the low voltage electrode 92 through the low voltage assembly 14 to channel plate 70.

Spacers 109 are positioned between dielectric barrier 28 and the low voltage electrode 92 to maintain a discharge region 110 having a fixed gap. Spacers 109 may be formed from a refractory metal such as tungsten. The spacers 109 may be approximately 0.005 inch thick and may be disposed at approximately 120° separation. It is desirable to make the fixed gap as small as possible so that the discharge region 110 is in close proximity to the dielectric barrier 28 and the low voltage electrode 92. This allows for more efficient cooling and, therefore, higher rates of ozone production.

Ozone generated by ozone generator cell 10 is removed through a passage 108 in the low voltage electrode 92, a passage 106 in the conductive layer 94, a passage 104 in layer 96, and a centrally located passage 86 in the cover plate 72 and in the channel plate 70. An ozone outlet manifold element 90 is coupled to the passage 86 by a conduit 88.

The ozone generator cell of FIG. 1A, constructed with the low voltage electrode formed from tungsten, generated ozone having a concentration that was approximately 20 to 40 percent higher than existing ozone generators constructed with the discharge region 110 being bounded by two dielectric surfaces. The ozone generator cell of FIG. 1A, constructed with the low voltage electrode formed from tantalum, molybdenum and niobium, also generated ozone having concentrations significantly higher than prior art ozone generator constructed with the discharge region 110 being bounded by two dielectric surfaces. In addition, the ozone generator cell of FIG. 1A, constructed with the low voltage electrode formed from a refractory material produced high concentrations of ozone using only ultrapure oxygen (i.e. grade 5 or higher) and no dopant gas.

Figure 1B:
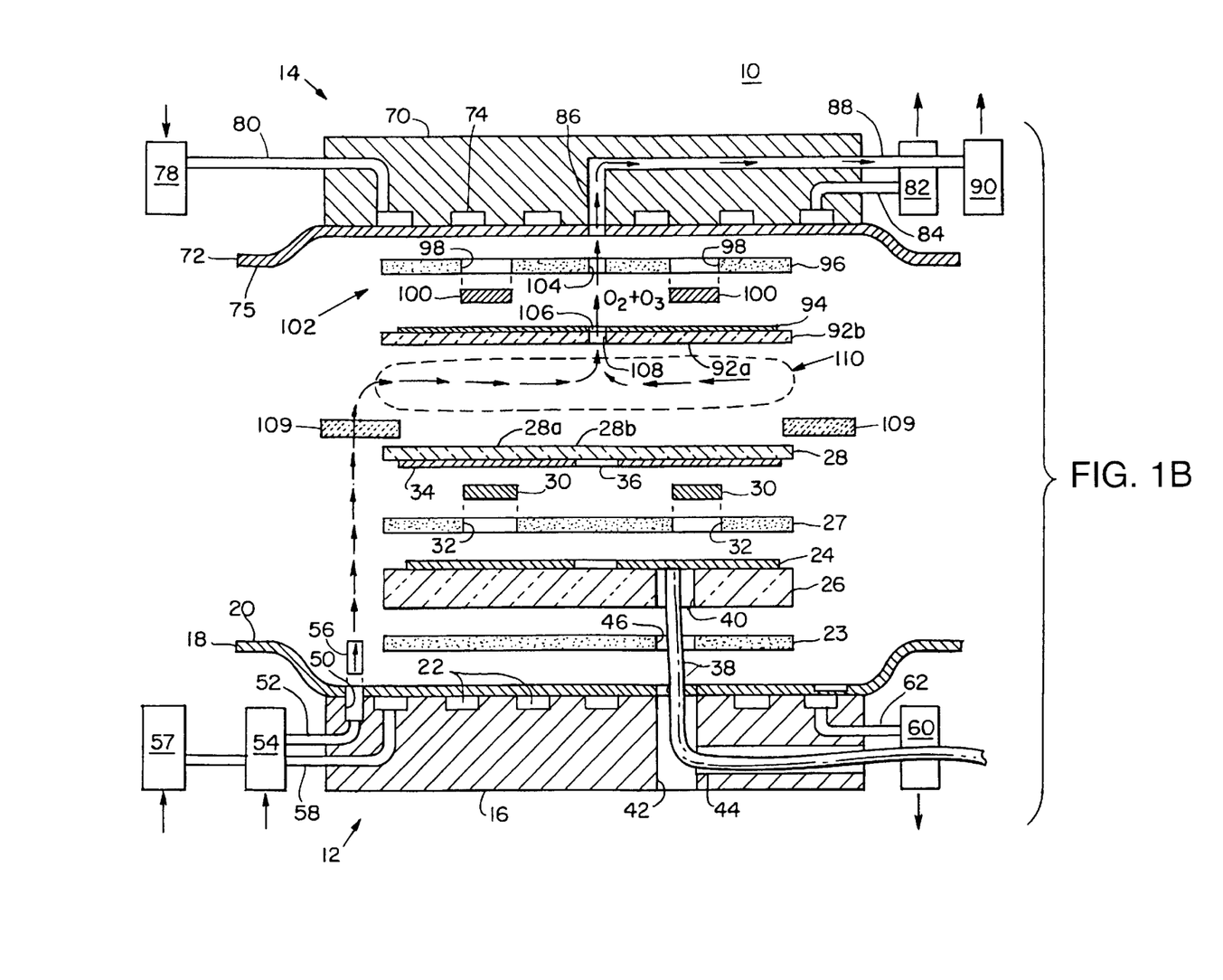

FIG. 1B illustrates an exploded sectional schematic view of another ozone generator cell 10 that embodies the invention. In this embodiment, the high voltage side of the discharge is exposed to a refractory material. The generator cell 10 includes a dielectric barrier 92B, which may be formed from alumina. The surface 28A of dielectric barrier 28 comprises a refractory material, such as a refractory metal, refractory compound, or refractory alloy as described above. A low voltage electrode 102 comprises the cover plate 72, the conductive elements 100, and the conductive layer 94.

Figures 2, 3:
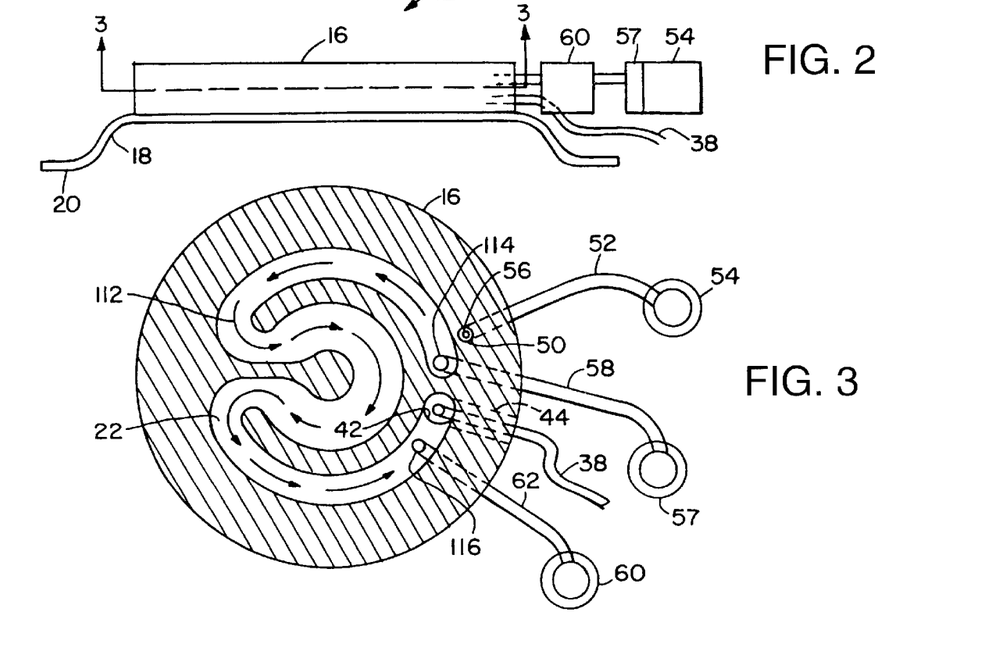
FIG. 2 illustrates a side elevation schematic view of the high voltage assembly of the ozone generator of FIGS. 1A and 1B.
FIG. 3 illustrates a sectional schematic view taken along line 3—3 of FIG. 2.

FIG. 2 illustrates a side elevation schematic view of the high voltage assembly 12 of the ozone generator of FIG. 1. The high voltage assembly 12 including the channel plate 16 and the cover plate 18 is shown. FIG. 2 also illustrates the high voltage lead wire 38. In addition, the coolant inlet manifold element 57, the coolant outlet manifold element 60, and the oxygen inlet manifold element 54 are shown.

FIG. 3 is a sectional schematic view taken along line 3—3 of FIG. 2. FIG. 3 illustrates the flow of coolant fluid through coolant channel 22. The serpentine flow of coolant is illustrated by arrows 112 as it moves from the coolant inlet manifold element 57 through conduit 58, a port 114, and then into the cooling channel 22. The coolant fluid is removed from channel 22 through a port 116, the conduit 62, and then to the coolant outlet manifold element 60. FIG. 3 also illustrates the oxygen inlet manifold element 54 that delivers oxygen through conduit 52 into oxygen input passage 50 containing flow restrictor 56. Oxygen is delivered about the periphery of channel plate 16.

Figure 4:
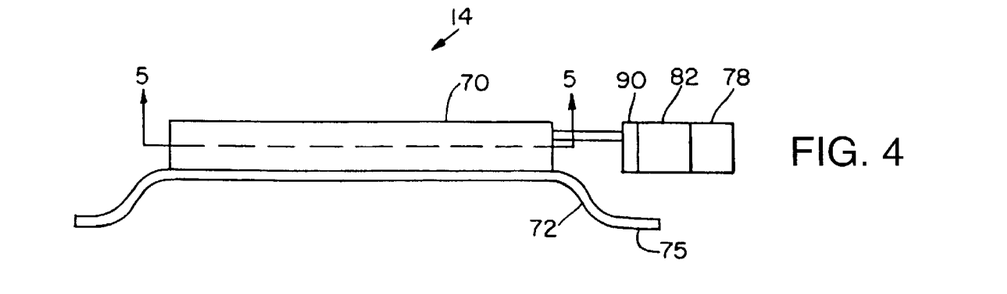
FIG. 4 illustrates a side elevational schematic view of the low voltage assembly of the ozone generator of FIGS. 1A and 1B.

FIG. 4 illustrates a side elevational schematic view of the low voltage assembly 14 of the ozone generator of FIG. 1. The low voltage assembly 14 including the channel plate 70 and the cover plate 72 is shown. FIG. 4 also illustrates the coolant inlet manifold element 78 and the coolant outlet manifold element 82. In addition, the ozone outlet manifold element 90 is shown.

Figure 5:
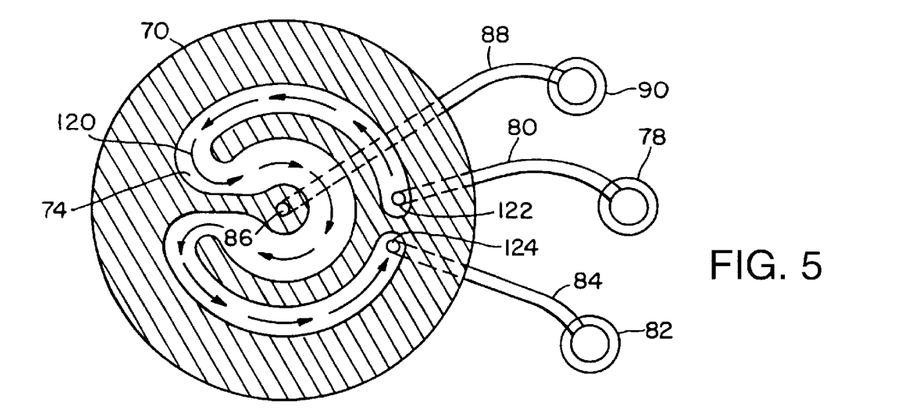
FIG. 5 is a schematic sectional view taken along lines 5—5 of FIG. 4.

FIG. 5 is a schematic sectional view taken along lines 5—5 of FIG. 4. FIG. 5 illustrates the flow of coolant fluid through coolant channel 74. The serpentine flow of coolant is illustrated by arrows 120 as it moves from the coolant inlet manifold element 78 through conduit 80, a port 122, and then into the cooling channel 120. The coolant fluid is removed from channel 120 through a port 124, conduit 84, and then to the coolant outlet manifold element 82.

FIG. 5 also illustrates the ozone removal path. Ozone generated by the cell 10 is removed through the centrally located passage 86 in the cover plate 72 and in the channel plate 70. The generated ozone flows from the passage 86 into conduit 88 and then to the gas outlet manifold element 90.

Figure 6:
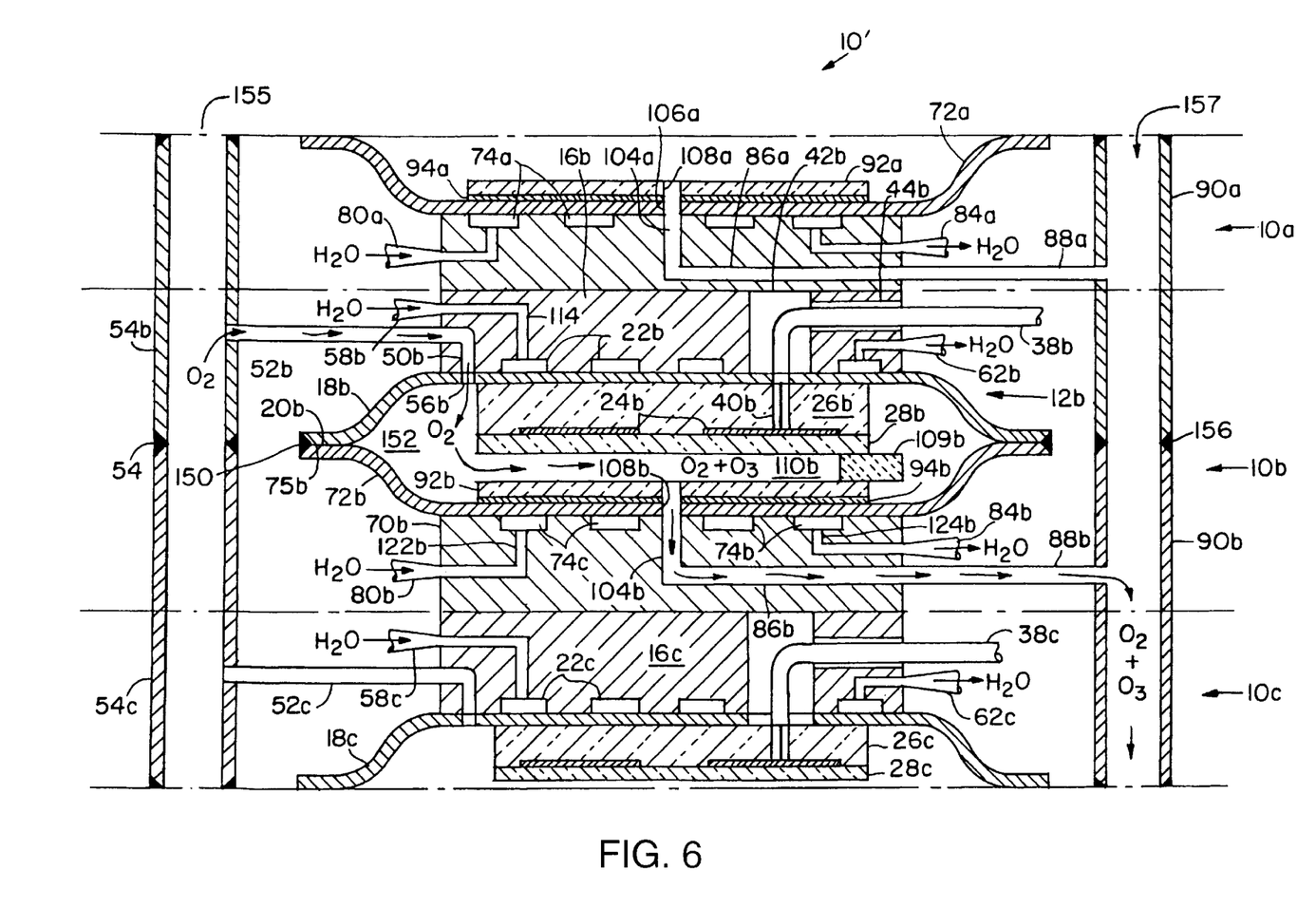
FIG. 6 illustrates a sectional view of an ozone generator system showing the modular stacking and manifolding of the ozone generator cell of FIGS. 1A and 1B.

FIG. 6 illustrates a sectional view of an ozone generator system showing the modular stacking and manifolding of the ozone generator cell of FIG. 1. A stack of ozone generator cells 10a, 10b, and 11c is modularly combined to form an ozone generator system 10'. Welding surfaces 20b and 75b are welded with a circumferential bead 150 thereby forming a sealed chamber in which a discharge region 110b is disposed. A circumferential or annular channel 152 is formed which receives oxygen from passage 50b and flow restrictor 56b.

Oxygen inlet manifold elements 54b and 54c are butt welded at a junction 154 to form an oxygen inlet manifold 155. Similarly, the ozone outlet manifold elements 90a and 90b are butt welded at a junction 156 to form an ozone outlet manifold 157. The coolant inlet manifold elements 57 and 78 (FIGS. 3 and 4) and the coolant outlet manifold elements 60 and 82 (FIGS. 3 and 4) are similarly shaped and butt welded.

Figures 7, 8, 9:
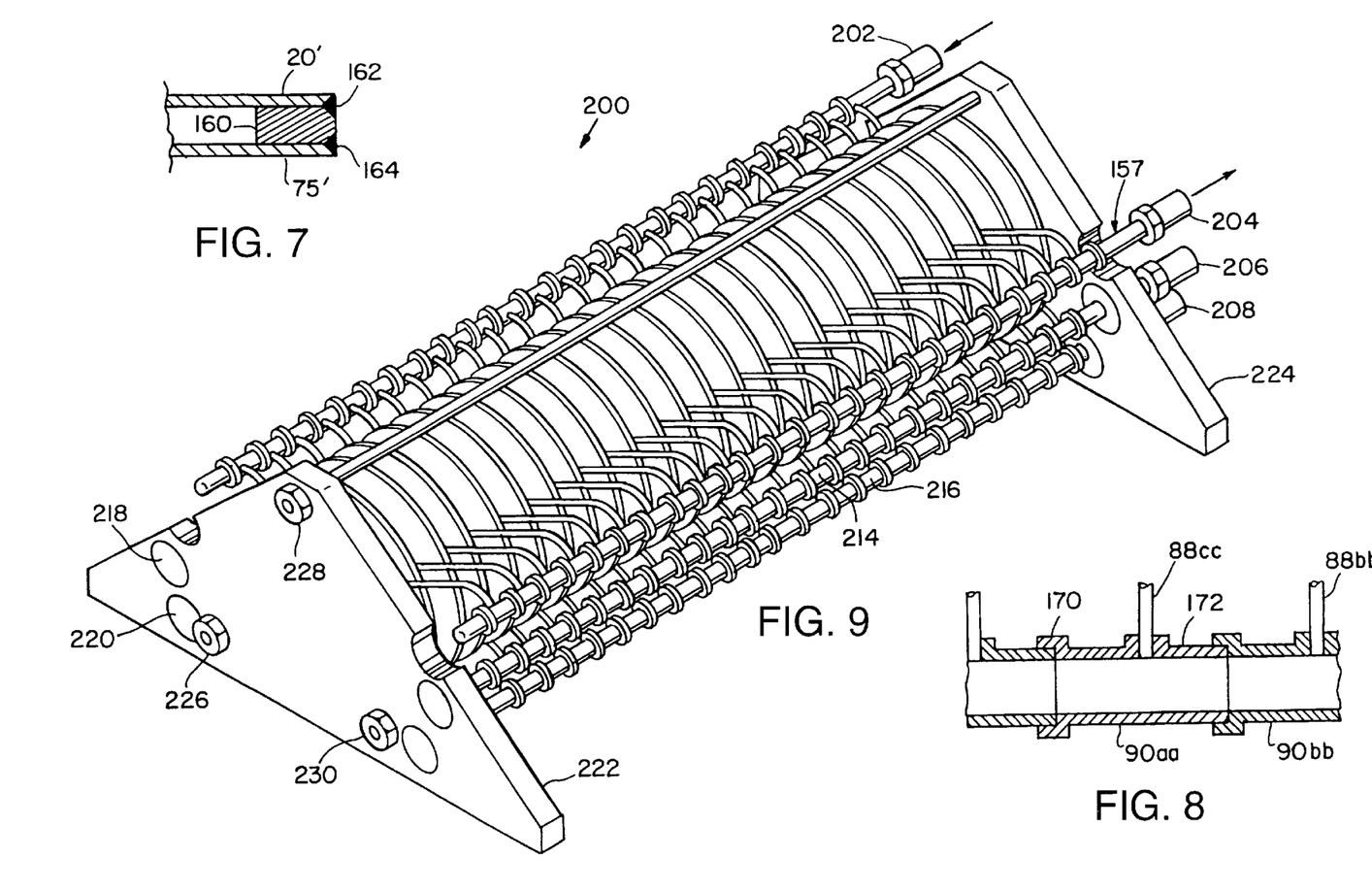
FIG. 7 is a partially broken away view of an alternative metallic welded seal for the high and low voltage assemblies.
FIG. 8 illustrates a side schematic cross-sectional view of an alternative manifold construction to that illustrated in FIG. 6.
FIG. 9 illustrates an ozone generator system including inlet and outlet gas and coolant manifolds modularly constructed from a plurality of ozone generator cells of FIGS. 1A and 1B.

FIG. 7 illustrates a partial broken away view of an alternative metallic welded seal for the high voltage assembly 12 and for the low voltage assembly 14. The high voltage assembly 12 and the low voltage assembly 14 may be welded together at surfaces 20' and 75' by joining an intermediate member 160 with metallic welds at junctions 162 and 164.

FIG. 8 illustrates a side schematic cross-sectional view of an alternative manifold construction to that illustrated in FIG. 6. Although the manifold elements 54b, 54c, 90a and 90b are shown in FIG. 6 as straight pipes which are butt welded, the invention can be practiced using numerous other configurations. For example, manifold elements 90aa and 90bb may each have a flared end 170 and a straight end 172 so that the straight end 172 of each element nests in the flared end 170 of a neighboring element. This configuration results in a more secure weld.

FIG. 9 illustrates an ozone generator system 200 including inlet and outlet gas and coolant manifolds modularly constructed from a plurality of ozone generator cells of FIG. 1A. Two triangular end plates 222, 224 support the system 200 using three threaded rod and nut assemblies 226, 228 and 230. The system 200 includes connectors 202, 204 for the gas inlet manifold 155 (FIG. 6) and for the gas outlet manifold 157. The system 200 also includes connectors 206, 208 for coolant inlets 214 and 216 and for coolant outlet manifolds 218 and 220.

Figure 10:
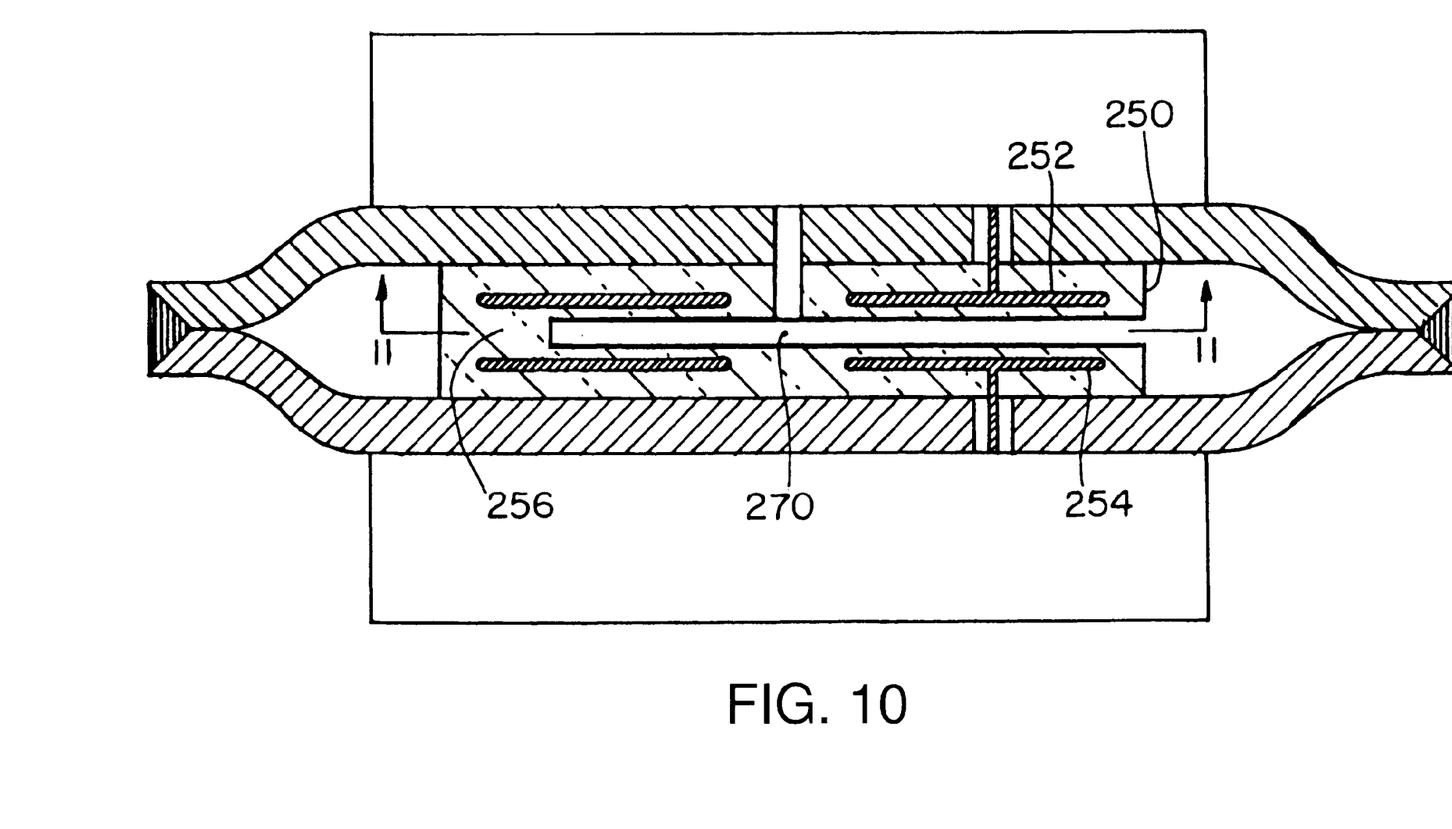
FIG. 10 illustrates a side schematic sectional view of an alternative design for the electrode and dielectric barrier.

FIG. 10 illustrates a side schematic sectional view of an alternative design for the electrode and dielectric barrier. A one-piece cofired dielectric incorporating gas channels, buried electrodes, isolation and dielectric barriers can be made which avoids the use of thermally conductive epoxies in close proximity to the electric discharge area. A dielectric barrier 250, a ground electrode 252 and a high voltage electrode 254 are all embedded in the same cofired dielectric which has a plurality of peripheral integral pads.

Figure 11:
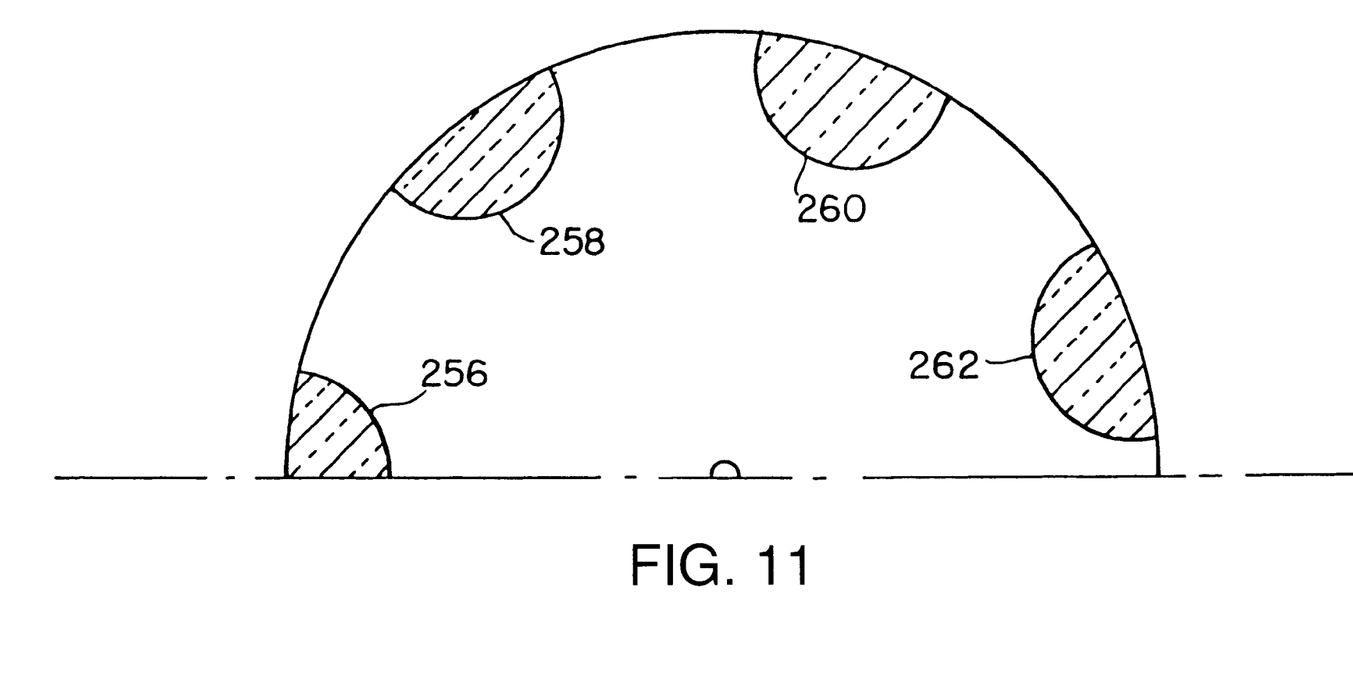
FIG. 11 illustrates a partial plan view taken along line 11—11 of FIG. 10.

FIG. 11 illustrates a partial plan view taken along line 11—11 of FIG. 10. FIG. 11 illustrates the plurality of peripheral integral pads 256, 258, 260, and 262. A discharge region 270 has a relatively small gap that improves cooling and ozone generation efficiency.

Figure 12:
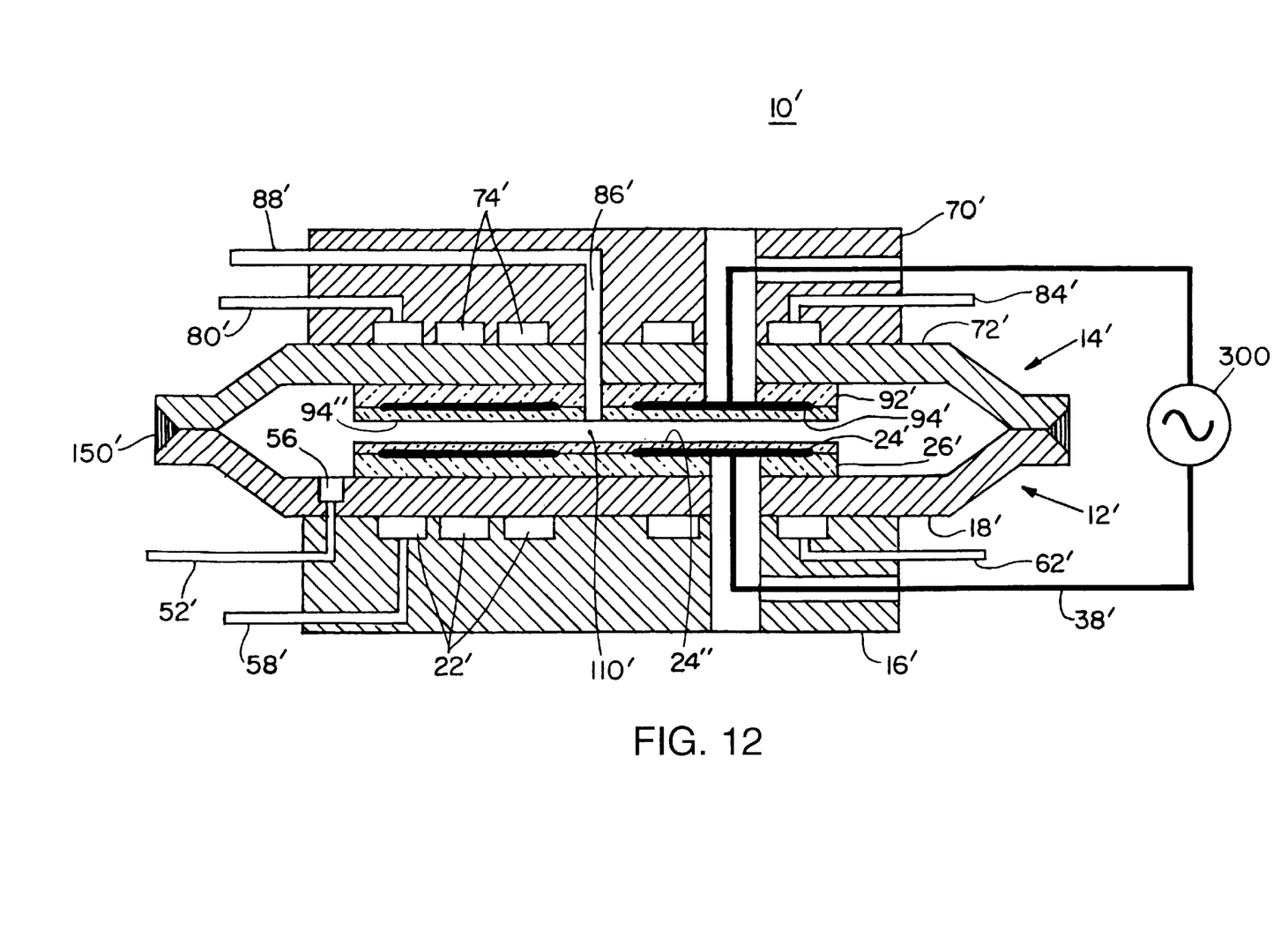
FIG. 12 illustrates a cross-sectional view of an alternative construction of an ozone generator system in which both electrode assemblies are isolated.

FIG. 12 illustrates a cross-sectional view of an alternative construction of an ozone generator system in which both electrode assemblies are isolated. The ozone generator cell 10' includes a first assembly 12' and a second assembly 14'. The first assembly 12' includes a channel plate 16' and a cover plate 18'. The first assembly 12' also includes a high voltage electrode 24' mounted on isolation dielectric element 26'. The second assembly 14' includes a channel plate 70' and cover plate 72'. The second assembly 14' also includes a low voltage electrode 94' mounted on dielectric barrier 92'. The voltage differential across electrodes 94' and 24' is provided by an alternating current drive 300, which applies an out-of-phase voltage across electrodes 94' and 24'.

A discharge region 110' is bounded by a refractory material surface. The refractory material surface may be positioned on a surface 94" facing the discharge region 110' or on a surface 24" facing the discharge region 110'. The refractory material may be a refractory metal, refractory compound, or refractory alloy as described above.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A reactive gas generator cell comprising:
   a) a high voltage assembly including a high voltage electrode plate;
   b) a low voltage assembly including a low voltage electrode plate;
   c) a refractory metal surface disposed on at least one of the low voltage electrode plate and the high voltage electrode plate;
   d) a dielectric barrier being disposed between the high voltage electrode plate and the low voltage electrode plate; and
   e) a discharge region being defined, at least in part, by the refractory metal surface selected from the group consisting of tungsten tantalum, molybdenum and niobium and a surface of the dielectric barrier, the discharge region being adapted to confine a reactive gas therein, the refractory metal surface reacting with gases generated by the generator cell thereby increasing ozone generation.

2. The generator cell of claim 1 wherein the refractory metal surface comprises tungsten.

3. The generator cell of claim 1 wherein the refractory metal surface is disposed on the low voltage electrode plate.

4. The generator cell of claim 1 further comprising a welded metallic seal joining the high voltage assembly and the low voltage assembly to create a permanently sealed chamber between the assemblies that includes the discharge region.

5. The generator cell of claim 1 wherein each of the high voltage assembly and the low voltage assembly includes a cover plate and a channel plate.

6. The generator cell of claim 1 wherein the dielectric barrier includes a conductive coating on a surface opposite the dielectric surface.

7. The generator cell of claim 1 further comprising a spacer being positioned between the surface of the dielectric barrier and the refractory metal surface to define a gap.

8. The generator cell of claim 7 wherein the spacer comprises a refractory material.

9. The generator cell of claim 7 wherein the gap is substantially 0.005 inch or less.

10. A reactive gas generator cell comprising:
   a) a high voltage assembly including a high voltage electrode;
   b) a low voltage assembly including a low voltage electrode;
   c) a refractory metal surface disposed on at least one of the low voltage electrode and the high voltage electrode;
   d) a dielectric barrier being disposed between the high voltage electrode and the low voltage electrode;
   e) a discharge region being defined, at least in part, by the refractory metal surface and a surface of the dielectric barrier, the discharge region being adapted to confine a reactive gas therein; and
   f) a welded metallic seal joining the high voltage assembly and the low voltage assembly to create a permanently sealed chamber between the assemblies that includes the discharge region.

11. The generator cell of claim 10 wherein the refractory metal surface comprises tungsten.

12. The generator cell of claim 10 wherein each of the high voltage assembly and the low voltage assembly further comprises a cover plate and a channel plate.

13. The generator cell of claim 12 further comprising an electrical insulator positioned between the electrode and the cover and channel plates of one or both of the high voltage assembly and the low voltage assembly.

14. The generator cell of claim 10 further comprising a spacer positioned between the surface of the dielectric barrier and the refractory metal surface to define a gap.

15. The generator cell of claim 14 wherein the spacer comprises a refractory material.

16. The generator cell of claim 14 wherein the gap is substantially 0.005 inch or less.

17. A generator cell comprising:
   a) a high voltage assembly including a high voltage electrode, a first cover plate and an electrical insulator, the electrical insulator being disposed between the high voltage electrode and the first cover plate;
   b) a low voltage assembly including a low voltage electrode and a second cover plate;
   c) a refractory metal surface disposed on at least one of the low voltage electrode and the high voltage electrode;
   d) a dielectric barrier being disposed between the high voltage electrode and the low voltage electrode;
   e) a discharge region being defined, at least in part, by the refractory metal surface and a surface of the dielectric barrier, the discharge region being adapted to confine a reactive gas therein;
   f) a spacer having a thickness and being positioned between the dielectric surface and the refractory metal surface thereby providing a gap; and
   g) a welded metallic seal joining the high voltage assembly and the low voltage assembly to create a permanently sealed chamber between the assemblies that includes the discharge region.

18. The generator cell of claim 17 wherein the refractory metal is tungsten.

19. The generator cell of claim 17 wherein the low voltage electrode comprises the refractory metal surface.

20. The generator cell of claim 18 wherein the spacer comprises a refractory material.

21. The generator cell of claim 18 wherein the gap is substantially 0.005 inch or less.

22. A generator system comprising a plurality of modular reactive gas generator cells, each cell comprising:
   a) a high voltage assembly including a high voltage electrode;
   b) a low voltage assembly including a low voltage electrode;
   c) a refractory metal surface disposed on at least one of the low voltage electrode and the high voltage electrode;
   d) a dielectric barrier being disposed between the high voltage electrode and the low voltage electrode;
   e) a discharge region being defined, at least in part, by the refractory metal surface and a surface of the dielectric barrier, the discharge region being adapted to confine a reactive gas therein;
   f) a welded metallic seal joining the high voltage assembly and the low voltage assembly to create a permanently sealed chamber between the assemblies that includes the discharge region; and
   g) an oxygen inlet and an ozone outlet which engage inlets and outlets of adjacent cells to establish an oxygen inlet manifold and an ozone outlet manifold.

23. The generator system of claim 22 wherein each oxygen inlet includes a flow restrictor for equalizing the pressure in the inlet manifold to balance a flow of oxygen to each cell.

24. The generator system of claim 22 wherein each assembly of each cell further comprises a coolant inlet and a coolant outlet which engage the coolant inlets and outlets of adjacent assemblies to establish a coolant inlet manifold and a coolant outlet manifold.

* * * * *

UNITED STATES PATENT AND TRADEMARK OFFICE
CERTIFICATE OF CORRECTION

Page 1 of 1

| | |
|---|---|
| PATENT NO. | : 5,932,180 |
| APPLICATION NO. | : 08/871088 |
| DATED | : August 3, 1999 |
| INVENTOR(S) | : Zhang et al. |

It is certified that error appears in the above-identified patent and that said Letters Patent is hereby corrected as shown below:

In the Claims

Column 8, line 60, claim 1, delete "of tungsten tantalum, molybdenum and niobium" and insert --of tungsten, tantalum, molybdenum and niobium--.

Signed and Sealed this
Sixteenth Day of September, 2014

Michelle K. Lee
*Deputy Director of the United States Patent and Trademark Office*